United States Patent [19]
Kot et al.

[11] Patent Number: 4,549,755
[45] Date of Patent: Oct. 29, 1985

[54] ARMORED CABLE CONNECTOR

[75] Inventors: Vincent Kot, Wantagh; Bruce Wallis, Northport; Alfred Robinson, Brooklyn, all of N.Y.

[73] Assignee: Efcor, Inc., East Farmingdale, N.Y.

[21] Appl. No.: 505,053

[22] Filed: Jun. 16, 1983

[51] Int. Cl.[4] ............................................. F16L 19/06
[52] U.S. Cl. .................................. 285/341; 285/161; 285/348; 285/354; 174/65 SS; 174/51
[58] Field of Search ............... 285/341, 161, 348, 354; 174/65 SS, 51

[56] References Cited
U.S. PATENT DOCUMENTS

| | | | |
|---|---|---|---|
| 3,567,843 | 3/1971 | Collins et al. | 285/341 X |
| 4,030,741 | 6/1977 | Fidrych | 285/161 |
| 4,490,576 | 12/1984 | Bolante et al. | 285/161 X |

Primary Examiner—Richard J. Scanlan, Jr.
Attorney, Agent, or Firm—Howard C. Miskin

[57] ABSTRACT

A watertight connector for jacketed metal clad armored cable includes cylindrical body member externally threaded at opposite ends and having an enlarged rear bore delineated from the front bore by an annular shoulder, the rear bore having a rearwardly facing conical face intermediate its front and rear ends. An elastomeric bushing has a front portion telescoping the conical face, a flat metal washer engages the bushing rear face and is superimposed by a relatively hard deformable plastic ring. A gland nut engages the body member rear threaded portion and has a conical forwardly facing shoulder bearing on the plastic ring. A grounding collar is located in the forward end of the enlarged bore and engages the annular shoulder and includes forwardly inwardly inclined resilient fingers.

9 Claims, 5 Drawing Figures

ARMORED CABLE CONNECTOR

BACKGROUND OF THE INVENTION

The present invention relates generally to improvements in connectors or the like and it relates particularly to an improved connector for effecting a watertight ground coupling of an armored cable to a utilization device.

It is often necessary to effect a coupling between a metal clad armored cable such as a jacketed type MC cable with interlocking smooth or corrugated sheathing, jacketed type AC armored cable, Tech cable or the like and a utilization device such as a junction box or other device. A general requirement for such a coupling is that it be waterproof, reliable, able to withstand various stresses, the proper grounding of the armour be effected and that the coupling procedure be simple and convenient. Many connector devices have been heretofore employed and proposed for the above purposes, such, for example, as disclosed in Canadian Pat. No. 1,067,167, of Nov. 27, 1979. While the connector device disclosed in the aforesaid Canadian patent is satisfactory it possesses some drawbacks and disadvantages among which is its limited ability to withstand high mechanical stresses such as excessive tension or pull, and twist between the cable and connector. A structure which attempts to reduce these drawbacks is described in U.S. Pat. No. 4,030,741 wherein separate components are provided for respectively effecting a gripping and a sealing of the cable to the connector but this structure poses further problems and leaves much to be desired.

SUMMARY OF THE INVENTION

It is a principal object of the present invention to provide an improved electrical connector.

Another object of the present invention is to provide an improved connector for coupling armored or jacketed cable and the like to a utilization device such as a junction box.

Still another object of the present invention is to provide an improved connector for providing a waterproof, stress resistant coupling between a jacketed armored cable and a junction box or the like.

A further object of the present invention is to provide an improved connector of the above nature characterized by its reliability, high strength, ruggedness, ease and convenience of application and great versitility and adaptability.

The above and other objects of the present invention will become apparent from a reading of the following description taken in conjunction with the accompanying drawings which illustrate a preferred embodiment thereof.

A connector device in accordance with the present invention comprises a body member with a peripheral screw thread and an axial bore with an inner radial constriction, a gland nut engaging the body member screw thread and having a peripheral shoulder confronting the constriction and a sealing and anchoring assembly entrapped and axially compressible between the constriction and shoulder, the device being characterized in that the assembly includes a relatively soft deformable sealing gland, a relatively hard flexible preferably deformable split anchoring ring coaxial with the bushing and a stiff washer preferably with flat opposite faces sandwiched between and unconnected to the confronting, preferably flat faces of the gland and split ring whereby tightening of the ring on the body member axially compresses the bushing and radially contracts the bushing and ring and the annulus minimizes the transmissions of torque between the ring and bushing and applies a uniform pressure to the bushing.

The bore constriction is advantageously defined by a forwardly radially inwardly tapering conical face and the bushing is of a resilient elastomeric material such as neoprene with a front peripheral face mating a nesting in the bore conical face. The washer is metal and the split ring is advantageously formed of a synthetic resin such as nylon and has a beveled rear peripheral edge engaged by a coinciding corresponding shoulder of the gland nut which is internally threaded and engages an outside thread on the body member. A metal grounding collar with radially inwardly projecting resilient fingers nests in the body member bore forward of the constriction.

The improved connector is reusable, easy and convenient to apply, highly waterproof and stress resistant and of great versatility and adaptability.

DESCRIPTION OF THE PREFERRED EMBODIMENTS

Figure 1:
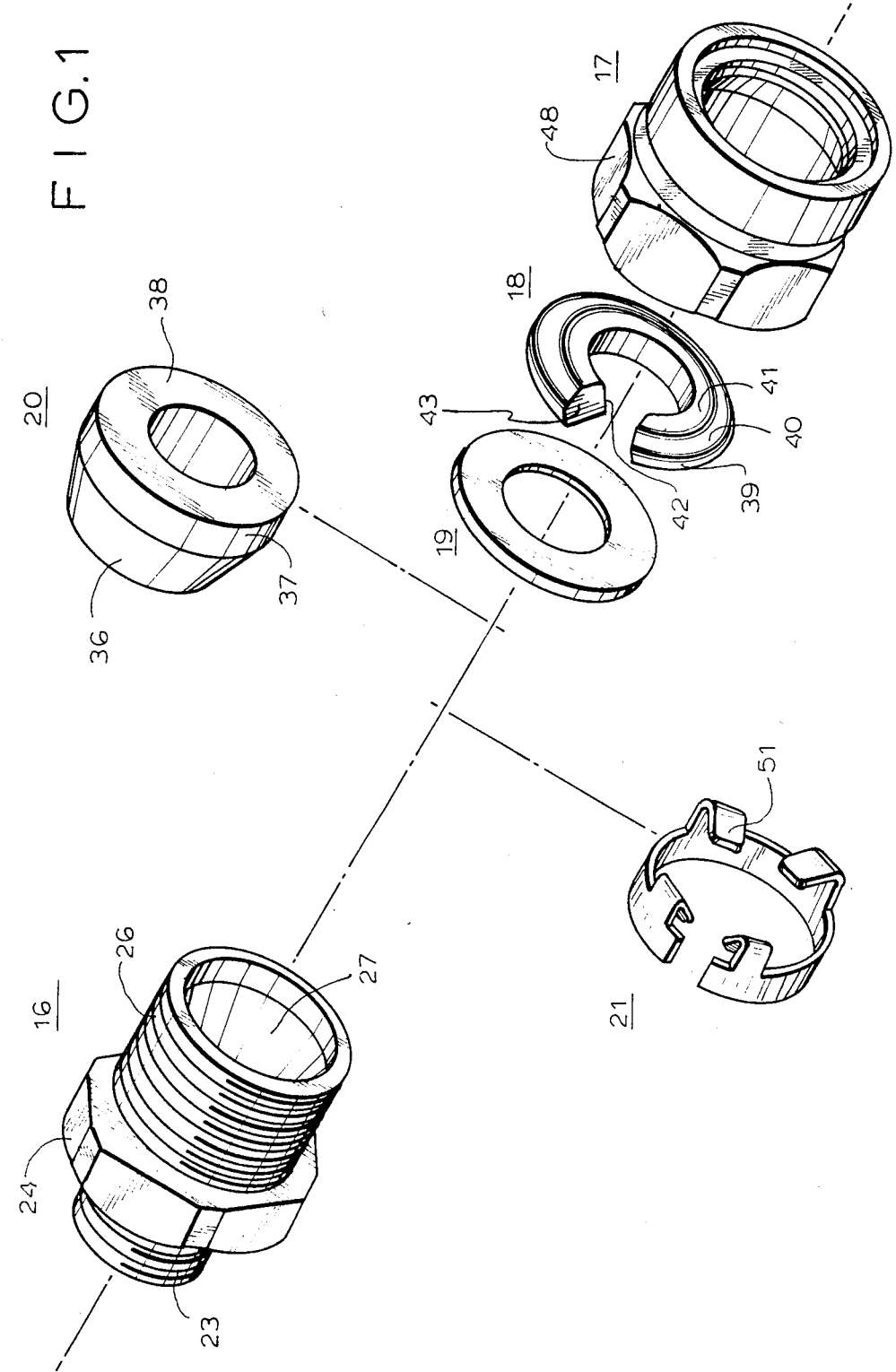
FIG. 1 is an exploded perspective view of a connector device embodying the present invention.
Figure 2:
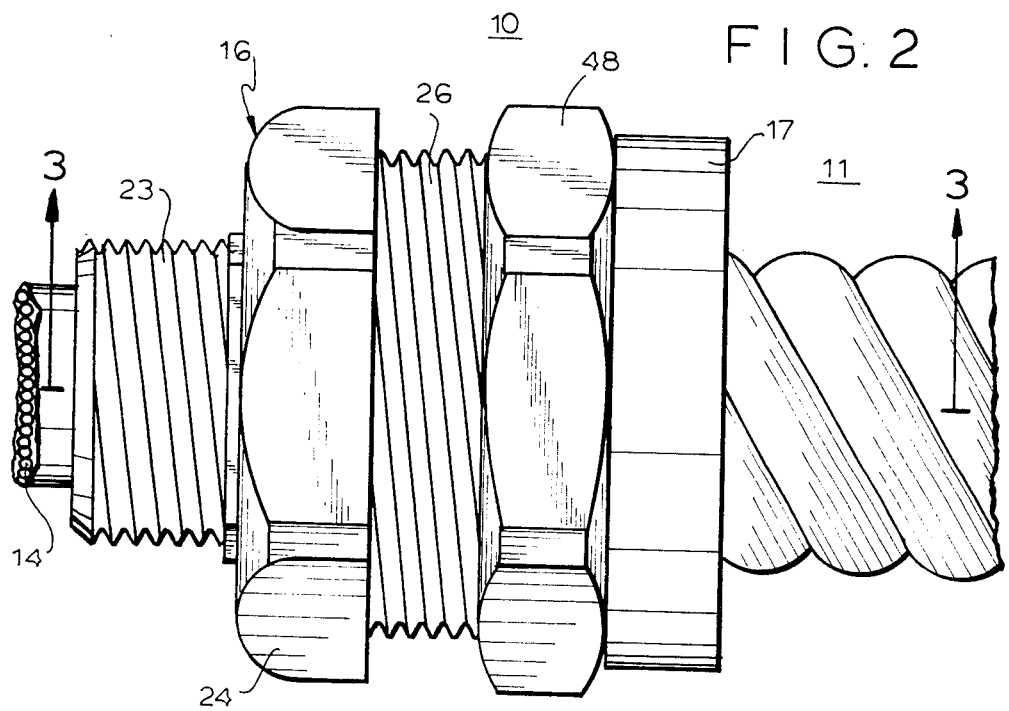
FIG. 2 is a front elevational view of the connector device in assembled condition shown in an untightened condition and applied to a jacketed armored cable.
Figure 3:
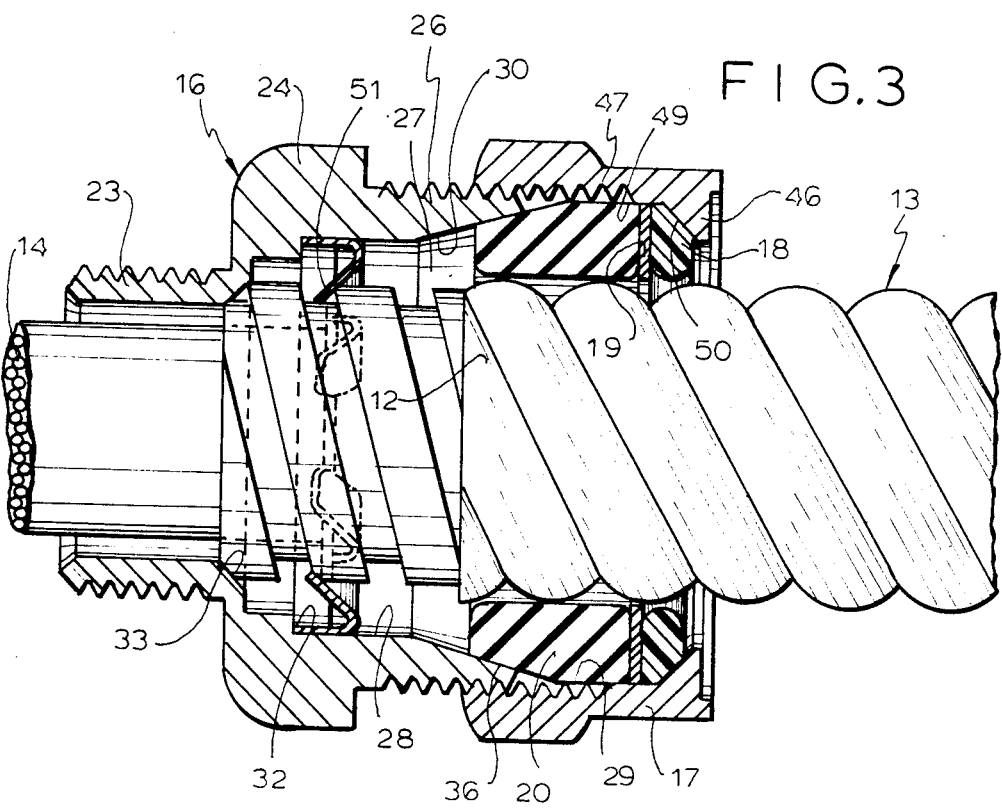
FIG. 3 is a sectional view taken along line 3—3 in FIG. 2.
Figure 4:
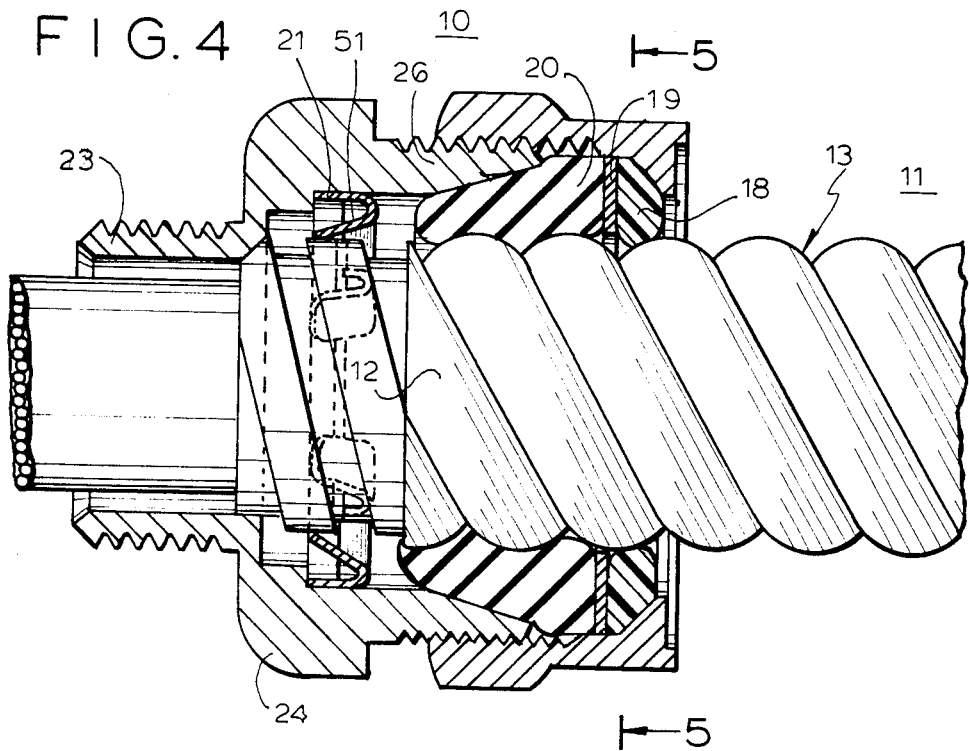
FIG. 4 is a view similar to FIG. 3 but with the device shown in a tightened condition.
Figure 5:
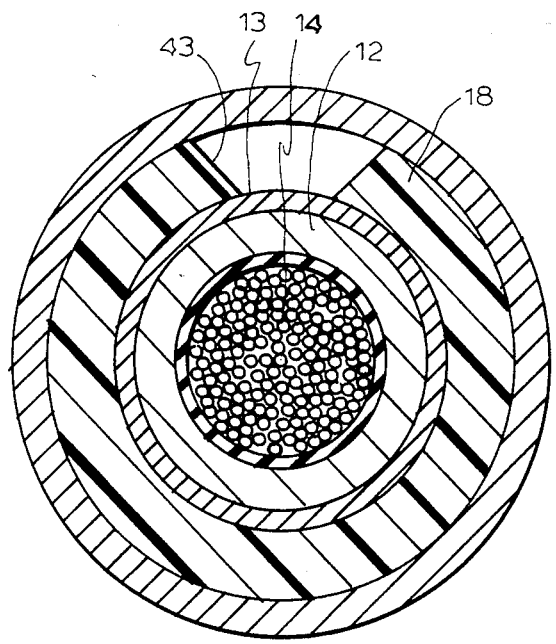
FIG. 5 is a sectional view taken along line 5—5 in FIG. 4.

Referring now to the drawings, which illustrate a preferred embodiment of the present invention, the reference numeral 10 generally designates the improved connector shown as applied to a water-tight jacketed metal clad armored cable 11 including a helically wound metal conduit 12 covered by a flexible plastic waterproof sheath 13 and enclosing a multiconductor cable 14. The connector 10 comprises a body member 16, a gland nut 17, a split anchor ring 18, washer 19, a seal gland 20 and a split grounding collar 21.

The body member 16 is formed of any suitable metal such as aluminum or zinc coated malleable iron or the like and is of cylindrical configuration including an exernally threaded front section 23 having an axial bore, a tool accomodating hexagonal intermediate section 24 and an externally threaded enlarged rear section 26. The body member bore includes an enlarged longer rear portion 27 having a short cylindrical front and rear faces 28 and 29 respectively joined by a relatively long conical face 30 forwardly radially inwardly tapered at a small angle. The bore rear portion 27 terminates at its front end in an annular shoulder 32 joined by a stepped annular face and a beveled face 33 with the reduced diameter bore portion of body member front section 23. The body member front section functions to couple and secure the connector 10 to a junction box or any other suitably contricted device.

The gland 20 is formed of a deformable, preferrably elastomeric material for example neoprene, and has its tapered front portion partly nested in the bore rear portion 27. The gland 20 has an axial bore of a diameter approximately equal to or slightly greater than the outside diameter of sheathed armored cable 11 and extends forwardly in bore portion 27 to a point short of bore section 28 and projects rearwardly of the body rear section 26. The forward outside face 36 of bushing 20 is forwardly inwardly tapered and engages and extends along the bore conical face 30 and the rear outside face 37 thereof is cylindrical.

The washer or annulus 19 is flat and relatively rigid and coincides with and bears against the flat rear end face 38 of bushing 20 and is formed of aluminum or the like. The split anchor ring 18, in turn, has a front flat face bearing on the flat rear face of washer 19 and is formed of nylon or other suitable relatively hard plastic which is flexible and deformable. The front narrow peripheral face 39 of split ring 18 is cylindrical and joins the rear peripheral bevel face 40 thereof which is conically inwardly rearwardly inclined and terminates in the ring rear face 41. The inside face 42 of split ring 18 is curved convex and the confronting end faces 43 thereof are radially planar and are sufficiently circumferentially spaced to permit the contraction of the ring 18 enough to tightly clamp or grip an engaged armored cable 11.

The end-to-end coaxial arrangement of split ring 18, washer 19 and bushing 20 is maintained in assembled condition and is axially compressable by the gland nut 17, the inside diameter of the split ring, washer and gland in their normal assembled condition being about equal. Gland nut 17 includes an annular end wall 46 with an inside diameter greater than that of split ring 18, washer 19 and bushing 20, and a peripheral skirt wall 47 provided at its forward end with a tool accomodating peripherally enlarged portion 48 of hexagonal transverse cross section. The forward inside face of skirt wall 47 is threaded and engages the thread of body member rear portion 26 and terminates in a cylindrical intermediate inside face 49 which engages bushing outside face 37. The inside face 50 of nut end wall 46 is rearwardly outwardly tapered and is of conical shape mating and engaging the split ring conical face 40.

The split grounding collar 21 is formed of resilient metal and tightly nests in the front end of body member bore 28 and abuts the shoulder 32. Integrally formed with the rear border of collar 21 are a plurality of peripherally spaced resilient contact fingers 51 which project forwardly radially inwardly from the rear edge of collar 21.

In applying the connector 10 to a sheathed armored cable 11 the metal conduit 12 is cut back to expose a sufficient length of conductors 14 and to project from the attached connector to permit and expedite their intended use and the sheath 13 is cut back to permit the grounding of conduit 12 and allow the engagement of both the sheath and conduit surfaces by the bushing 20. The trimmed armored cable is then inserted the assembled connector bore until the leading end of conduit 12 engages and outwardly resiliently deflects grounding collar fingers 51. The gland nut 17 is then turned in a tightening direction on body member 16 to axially compress the assembly of gland 20, washer 19 and split ring 18, the washer 19 effecting the uniform application of axial pressure to bushing rear face 38 and eliminating or minimizing the application of any twist or torque to bushing 20 with the relative turning of gland nut 17.

With the tightening of gland nut 17 the bushing 20 is axially advanced along a conical face 30 and is radially deformed and contracted to firmly conform to and engage the outer face of helical conduit 12, jacket 13 and bore conical face 36 and effect a secure and reliable watertight seal between these surfaces. Moreover, the split ring 18 is axially compressed between washer 19 and gland nut conical shoulder 50, under the influence of the back pressure of bushing 20 to radially contract the ring 18 into a tight anchoring engagement with the outside face of cable 11 after the bushing 20 has effected the watertight seal. The inside face of the split ring may be deformed to mate with the confronting face of cable 11 and reduces transmission of any pull on the cable to the gland 20. The washer 19 minimizes the transmission of torque to the gland.

While there has been described and illustrated a preferred embodiment of the present invention it is apparent that numerous alterations, omissions and additions may be made without departing from the spirit thereof. For example, the gland nut 17 instead of having a tool accomodating enlarged hexagonal head may be otherwise formed, for example, with peripherally spaced tool accomodating longitudinal ribs or splines.

We claim:

1. A connector for coupling an armored cable comprising a body member with a peripheral screw thread and an axial bore with an inner radial constriction, a gland nut engaging said screw thread and having a peripheral shoulder confronting said constriction, and a sealing and anchoring assembly entrapped and axially compressible between said constriction and shoulder and characterized in that said assembly includes a relatively soft deformable sealing bushing, a relatively hard, flexible split anchoring ring coaxial with said bushing, said ring and bushing having axially spaced circumferentially parallel, confonting faces, and a relatively stiff annulus sandwiched between said confronting faces of said bushing and ring whereby tightening of said nut on said body member axially compresses and radially contracts said bushing and radially contracts said ring and said annulus minimizes the transmission of torque between said ring and bushing.

2. The connector of claim 1 wherein said bushing is formed of an elastomeric material.

3. The connector of claim 2 wherein said annulus is flat with opposite planar faces and the confronting faces of said ring and bushing are substantially flat.

4. The connector of claim 3 wherein said annulus is formed of metal.

5. The connector of claim 4 wherein said split ring is formed or nylon.

6. The connector of claim 4 wherein said constriction is defined by the forward radially tapering of said axial bore and said bushing has a conical peripheral face nesting in said constriction.

7. The connector of claim 4 wherein said ring has a bevelled outer peripheral edge and said peripheral shoulder of said nut is conical and matingly engages said peripheral edge.

8. The connector of claim 1 including a metal grounding collar coaxially positioned in said body member bore and including radially inwardly directed resilient fingers.

9. The connector of claim 1 wherein said body member is externally threaded at opposite ends thereof and said gland nut includes an internally threaded skirt wall engaging one of said body member threaded ends and an annular end wall.

* * * * *